(12) United States Patent
Pedicano

(10) Patent No.: US 8,181,881 B2
(45) Date of Patent: May 22, 2012

(54) STRETCHABLE WRISTBAND WITH RFID CHIP

(76) Inventor: James Joseph Pedicano, Austin, TX (US)

( * ) Notice: Subject to any disclaimer, the term of this patent is extended or adjusted under 35 U.S.C. 154(b) by 414 days.

(21) Appl. No.: 12/543,994

(22) Filed: Aug. 19, 2009

(65) Prior Publication Data

US 2010/0043266 A1    Feb. 25, 2010

Related U.S. Application Data

(60) Provisional application No. 61/090,114, filed on Aug. 19, 2008.

(51) Int. Cl.
*G06K 19/06* (2006.01)
(52) U.S. Cl. .................................................... 235/492
(58) Field of Classification Search .................. 235/492, 235/493; 40/633
See application file for complete search history.

(56) References Cited

U.S. PATENT DOCUMENTS

| | | | | |
|---|---|---|---|---|
| 6,772,445 | B2 * | 8/2004 | Yeager | 2/170 |
| 6,836,215 | B1 * | 12/2004 | Laurash et al. | 340/572.1 |
| 7,204,425 | B2 * | 4/2007 | Mosher et al. | 235/492 |
| 2008/0290176 | A1 * | 11/2008 | Fleet | 235/492 |
| 2008/0301853 | A1 * | 12/2008 | Cummiskey et al. | 2/170 |

* cited by examiner

*Primary Examiner* — Seung Lee
(74) *Attorney, Agent, or Firm* — Dubois, Bryant & Campbell, LLP; William D. Wiese

(57) ABSTRACT

The present invention is an article of apparel, such as a wristband, that includes an radio frequency identification (RFID) device. The wristband is at least partially formed from an elastomeric material that allows the wristband to stretch while being drawn over the user's hand. The RFID device is positioned on or within the wristband. Once affixed, the RFID device remains an integral part of the wristband. The wristband may be used in any available RFID application, including a contactless payment system.

30 Claims, 10 Drawing Sheets

STRETCHABLE WRISTBAND WITH RFID CHIP

CROSS-REFERENCE TO RELATED APPLICATION

This non-provisional application claims priority based upon prior U.S. Provisional Patent Application Ser. No. 61/090,114 filed Aug. 19, 2008 in the name of James Joseph Pedicano, et al. entitled "Contactless, Stretchable Commerce Bracelet," the disclosure of which is incorporated in its entirety herein by this reference.

BACKGROUND OF THE INVENTION

In the early to mid-2000s, stretchable wristbands became popular. Such wristbands were generally made of silicone and are sometimes called "awareness bracelets" to distinguish them from other types of wristbands. Aside from their pervasive appeal as fashion accessories, stretchable wristbands have several other uses. Perhaps their most well-known use is in fundraising for charitable causes. Stretchable wristbands have been used in campaigns against terminal diseases (e.g. LiveStrong, American Cancer Society), in support of victims of natural disasters (e.g. Tsunami Relief Wristbands), to show solidarity with sports teams or community groups, as well as for a wide variety of other uses.

Much of the stretchable wristband's popularity stems from its capacity to convey a message. A wristband's look and feel can be customized to fit the desires of the promoters, particularly through color selection and pattern design. Most manufacturers provide a wide range of color choices for stretchable wristbands and alter the color by dying the pre-molded silicone stock. In addition to single color bands, manufacturers are able to provide multi-colored segmented bands and marbleized or "swirled" bands that combine several colors in an intertwined pattern.

Beyond simply altering the color and design, a message can be added to the wristband by one or more of the following means: embossing (raised letters that protrude about 2 millimeters from the band's surface); debossing (letters that are recessed into the band); colored debossing (adding dye or other coloring to debossed letters); and screen printing (silk screening text directly to the band's surface).

Although many bracelets are produced with other synthetic rubber materials, the majority of current decorative wristbands are made specifically from silicone. Silicone is a bonded polymer substance with numerous elastomeric qualities that make it both flexible and water resistant. Silicone is also fairly heat resistant but can be susceptible to deterioration from UV exposure.

Silicone rubber stock is typically extruded into strips or tubes of varying thickness, which are then compression molded into the familiar round cross-section of a wristband. The silicone bands display high levels of elasticity, allowing them to be pulled or drawn over most wrists. As a result, the majority of these decorative wristbands are produced with a circumference between about 18 and 22 cm. The width of the wristband is usually between about 12 mm and 14 mm, while the thickness is approximately 4 to 5 mm.

In a separate development, financial service providers began introducing contactless radio frequency identification (RFID) credit cards around 2004 or 2005. These cards can be waved at a retailer's reader, eliminating the need for a "swipe" or signature. Leading banks are now issuing millions of contactless credit and debit cards to consumers, and leading retailers are installing contactless readers that are integrated with point-of-sale (POS) systems. The rate of adoption of contactless payment systems is one of the highest ever observed for emerging payments products in recent years and signals a unique market opportunity.

RFID devices, such as credit cards, debit cards, key fobs, documents, watches, cell phone covers and the like, consist of a secure microcontroller or equivalent intelligence, internal memory, and a small antenna embedded in a device that communicates with a reader through a contactless radio frequency interface. The microchip in an RFID device can securely manage, store, and provide access to data on the device in which they are embedded. They can perform internal functions (e.g., encryption) and interact intelligently with the contactless reader. This technology is distinguishable from passive radio frequency chip technologies, such as the RFID tags used for inventory management/product tracking applications, which require minimal functionality.

A contactless payment requires no physical connection between the consumer payment device and the physical point of sale terminal. There are a number of providers of contactless payment systems in the United States, including American Express (ExpressPay), MasterCard (PayPass), and Visa (PayWave). Each of these products is based on the ISO/IEC 14443 standard, the international standard for contactless smart chip technology. Under this standard, contactless payment devices are restricted to be read within 2 to 4 cm of a point of sale terminals opposed to RFID tags which are designed to be read at large distances. In addition, contactless payment applications include other measures that are specifically designed to protect the security of the consumer's information and the payment transaction.

By issuing secure contactless payment devices, financial service providers are not only supplying consumers with a more convenient payment mechanism, they are also increasing transaction volumes by replacing cash. In addition, service providers can now differentiate themselves with innovative new form factors.

It is now apparent that it would be desirable to combine the ubiquity of the stretchable wristband with the convenience of RFID technology for use in contactless payment systems, healthcare systems, and other systems. In a contactless payment system, such a method and system would allow faster and easier payment transactions and would allow the user to maintain control of the RFID device at all times, both during the transaction and between transactions. In addition, it would allow payments to be processed through the same, reliable payment network as current contactless payment systems and magnetic strip transactions. However, the existing technology is not well suited for combining a stretchable wristband with an RFID device.

For example, existing wristbands with RFID chips are not well suited for use in a contactless payment system. The commercially available wristbands comply with the ISO 15693 air protocol, an unencrypted protocol designed primarily for inventory tracking, using both high frequency (13.56 MHz) and ultra-high frequency (860-960 MHz) bands. A representative example of a commercially available wristband is shown in FIG. 1. In this wristband 100, the RFID component is contained in the large area 102 adjacent to the snap 101. These wristbands are generally design for short term (1-2 days continuous) use. NXP I-code SLI and Texas Instruments Tag-It 2K are examples of chips commonly used in these wristbands. The wristbands are generally constructed of vinyl or polyester laminated films. These wristbands are not stretchable and are not configured for use with contactless payment systems.

The commercially available chips that are designed for use in a contactless payment system are sold in a molded package, similar, if not identical, to the NOA3 package offered by Nedcard Ltd. of Belgium. A representative package size is 5.15 mm×8.0 mm×0325 mm. The chip size is typically 2 mm×2 mm×0.015 mm though there is significant variation between manufacturers. Because the package is designed to protect the IC during fabrication and are designed for use on a PVC laminated card, the package is stiff and very robust and, as a result, not suitable for use in a stretchable wristband.

As is apparent to those skilled in the art, there are numerous obstacles to embedding traditional RFID microchips and antennas into a stretchable wristband. For example, the wristband must possess the requisite elasticity to stretch when drawn over the user's hand, but must also be UV stable enough to protect the RFID chip and antenna. The wristband must be durable enough to withstand the rigors of daily living, including activities such as exercise and bathing, while protecting the integrity of the chip. To maximize market acceptance, the wristband must be configured dimensionally to conform to currently available wristbands which may require the microchip and antenna to be smaller than otherwise permissible. The microchip and antenna must be configured on or in the wristband in such a manner that the stretching of the band during use does not damage the microchip, the antenna, or the connection therebetween.

Other issues related to the combination of elastic wristbands and RFID devices arise in the manufacturing process. The microchip and antenna must be protected during the manufacturing process so that they are not damaged or destroyed and the connection between the microchip and antenna must not be dislodged or compromised. The microchip and antenna package must be properly adhered to the wristband, either temporarily during the molding process if the package is included within the mold, or permanently if the package is adhered to the outside of the wristband. Resins must be selected which match the "skin feel" of currently available wristbands but that are also compatible with the microchip and antenna. In addition, the finished product must be aesthetically pleasing and appear the same as commercially available wristbands, including matching the color, indented lettering and, if the wristband is manufactured in two parts, making the two portions of the wristband indistinguishable.

In addition to the complexities inherent in the use and manufacture of an RFID wristband, issues arise with the integration into the existing contactless payment system. The RFID device must be selected so that, when it is installed in or on the wristband, the wristband complies with ISO/IEC 14443, the international standard for contactless smart chip technology. Since the wristband must be relatively soft for the wristband to be sufficiently flexible, the components embedded in this material are not well protected against external pressure and are liable to become damaged quickly when the wristband is worn on the wrist. This is likely one reason that this type of wristband has not met with commercial success to date.

For the forgoing reasons, it is desirable to have a stretchable wristband with an embedded RFID chip and antenna which is capable of continuous wear over extended periods and also compatible with ISO/TEC 14443 standards and existing point of sale payment systems.

SUMMARY OF THE INVENTION

In various embodiments, the present invention concerns a wristband which includes an RFID microchip and antenna, wherein the microchip and antenna are protected from external forces, including the forces exerted during the stretching of the wristband. The fragile elements of the wristband, namely the microchip and antenna, are mounted economically in or on the wristband and are protected during wear. The wristband may be completed by other external elements, for example decorative elements which match a company's loyalty program or a university's colors.

The constituent elements of the microchip and the antenna are incorporated in the wristband using a variety of means. In one embodiment, a preform is molded with a groove along the inner surface. The chip and antenna are inserted into the groove, and in some embodiments temporarily affixed in the groove, and then overmolded with a material capable of adhering to the preform and securing the chip and antenna permanently in the groove. In other embodiments, the chip and antenna are adhered to a polymeric film, or in some embodiments between polymeric films, and subsequently adhered to the inside or outside of an existing wristband.

The foregoing has outlined rather broadly certain aspects of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE EMBODIMENTS

The present invention provides an improved wristband with an integral RFID device; a method for making the wristband, and a method for transacting business with the wristband. The making and using of the presently preferred embodiments are discussed in detail below. It should be appreciated, however, that the present invention provides many applicable inventive concepts that can be embodied in a wide variety of specific contexts. For example, while the wristband of the present invention is described for use in a contactless payment system, it may similarly be useful in government and corporate identification cards, electronic passports and visas, storing employee information, student information, or personal health information, and numerous other applications. Accordingly, the specific embodiments discussed are merely illustrative of specific ways to make and use the invention, and do not limit the scope of the invention.

Figure 1:
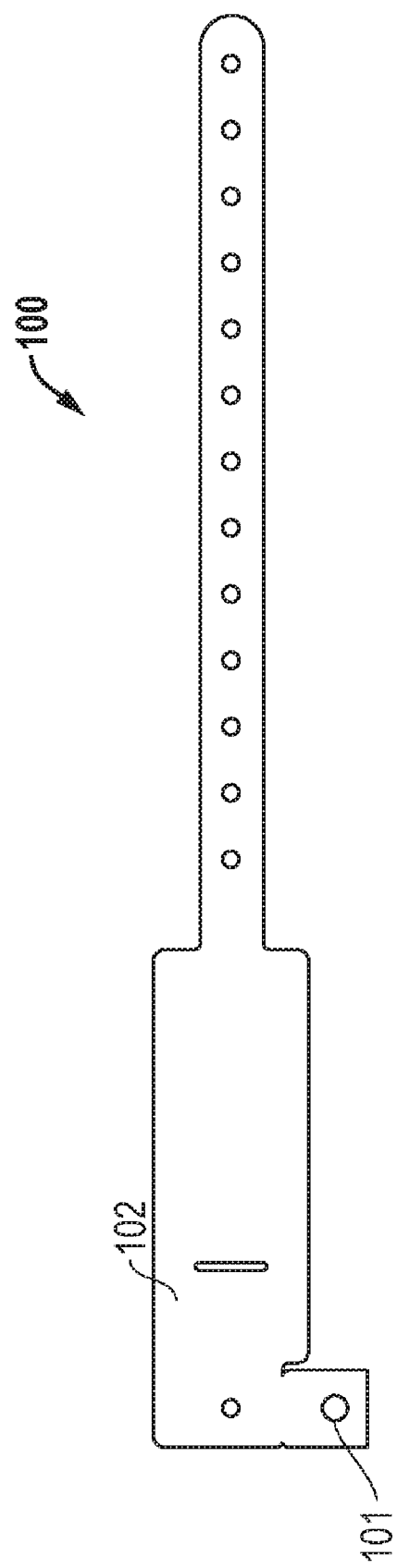
FIG. 1 shows a previously disclosed and currently available RFID wristband.
Figure 2:
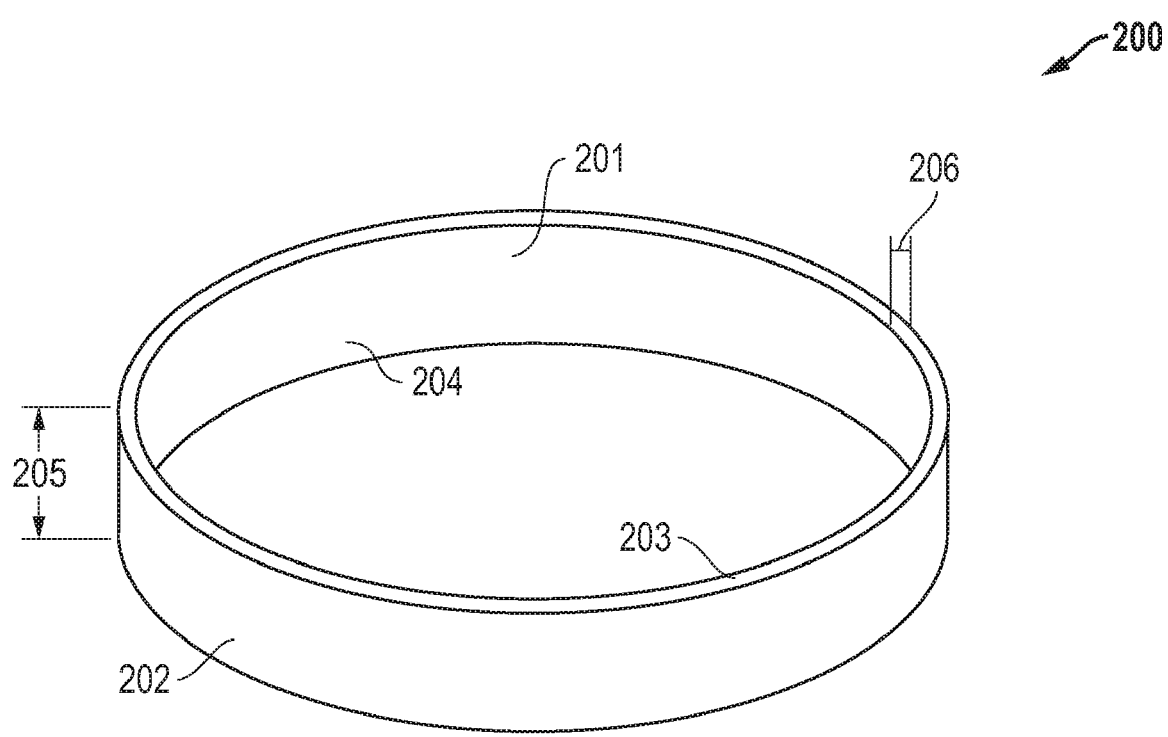
FIG. 2 shows an isometric view of a stretchable wristband known in the prior art.

Referring now to the drawings, FIG. 2 shows one embodiment of a stretchable wristband 200 in which the word "SAMPLE" is debossed on the band. Wristband 200 has an inner surface 201, and outer surface 202, a top edge 203 and a bottom edge 204, wherein inner surface 201 is approximately equidistant from outer surface 202 along the entirety of the circumference of wristband 200 and top edge 203 is approximately equidistant from bottom edge 204 along the entirety of the circumference of wristband 200. The circumference of the wristband 200 is generally between about 18 cm and 22 cm. The width 205 of wristband 200 is generally between about 12 mm and 14 mm, and the thickness 206 is generally approximately 4 to 5 mm. The wristband can be made of any suitable elastomeric material and such material may stretch as much as 115 to 200 percent (i.e. a wristband with a circumference of about 20 cm may stretch to a circumference of between about 23 cm and 40 cm). One example is Versaflex CL30 thermoplastic elastomer alloy. This material possesses soft touch, very good clarity and colorability, overmold adhesion to polypropylene, and good ozone/UV stability.

Figure 3A:
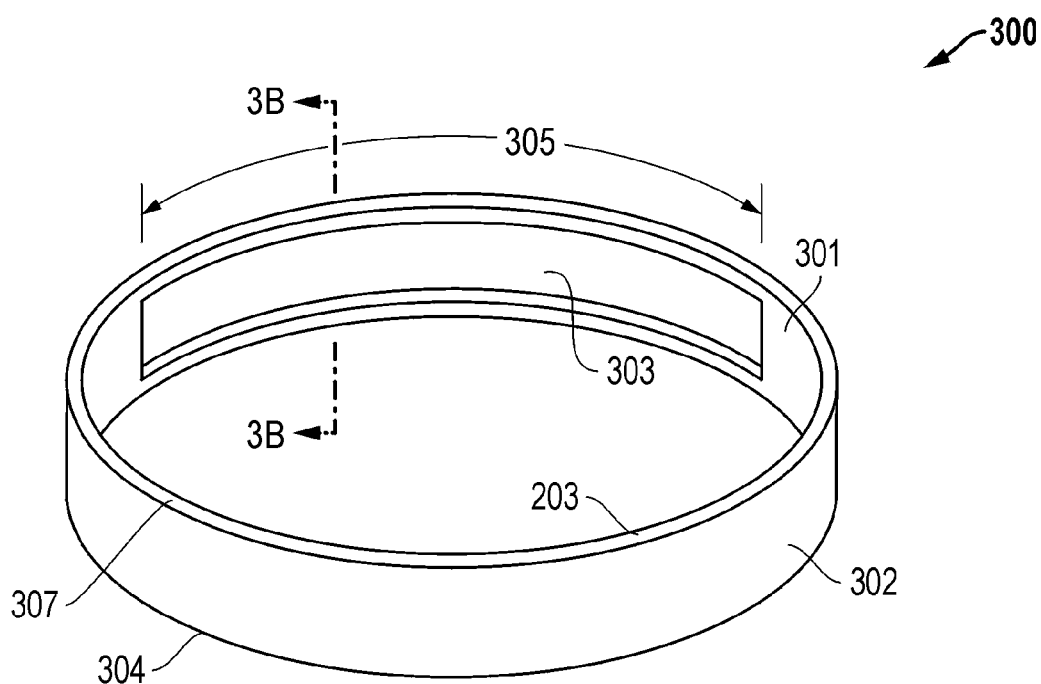
FIG. 3A shows an isometric view of one embodiment of a preform of a wristband of the present invention with a groove along the interior surface.
Figure 3B:
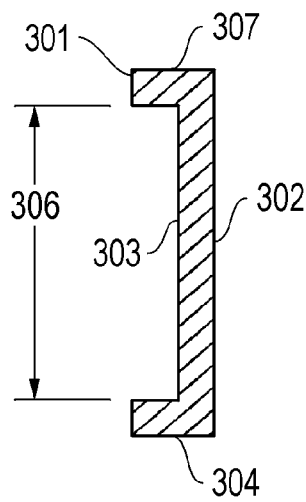
FIG. 3B shows a lateral cross-section of one embodiment of a preform of a wristband of the present invention with a groove along the interior surface.

In one embodiment, show in FIGS. 3A and 3B, wristband 300 is a circular wristband, without the need for snaps, hooks, Velcro, or other fasteners to be positioned and worn on the wrist, configured with a groove 303 on the inside 301 of wristband 300. The top edge 307 of wristband 300 is approximately equidistant from the bottom edge 304 along the entire circumference of wristband 300 and, in one embodiment, the top edge of groove 303 are approximately equidistant from one another. An RFID chip and antenna (not shown) may be placed within the groove 303 and, once in the groove 303, wristband 300 may be overmolded to fill the remaining portions of groove 303 so as to secure the RFID chip and antenna in place and to make the inside 301 of the wristband 300 over groove 303 the same as the other portions of the inside 301 of the wristband 300. The length 305 and the height 306 of the groove 303 may be any dimension necessary to accommodate the RFID chip and antenna.

A number of factors affect the material selection process for the overmold resin. The properties of the substrate material drive some requirements, while the performance profile for the application determines others. Such factors include the ability of the material to resistance chemicals encountered during use (including cleaning), the material's flame retardancy, the material's compliance with environmental or social standards, the material's ability to resist abrasion, the material's Shore hardness, the material's medical specifications (FDA, USP Class VI, ISO 10993, and biocompatibility), the material's ability to be sterilized (through steam, gamma radiation, etc.), the material's impact resistance, the material's melting point and its ability to resist softening or distortion, and the material's bonding mechanism.

Figure 4:
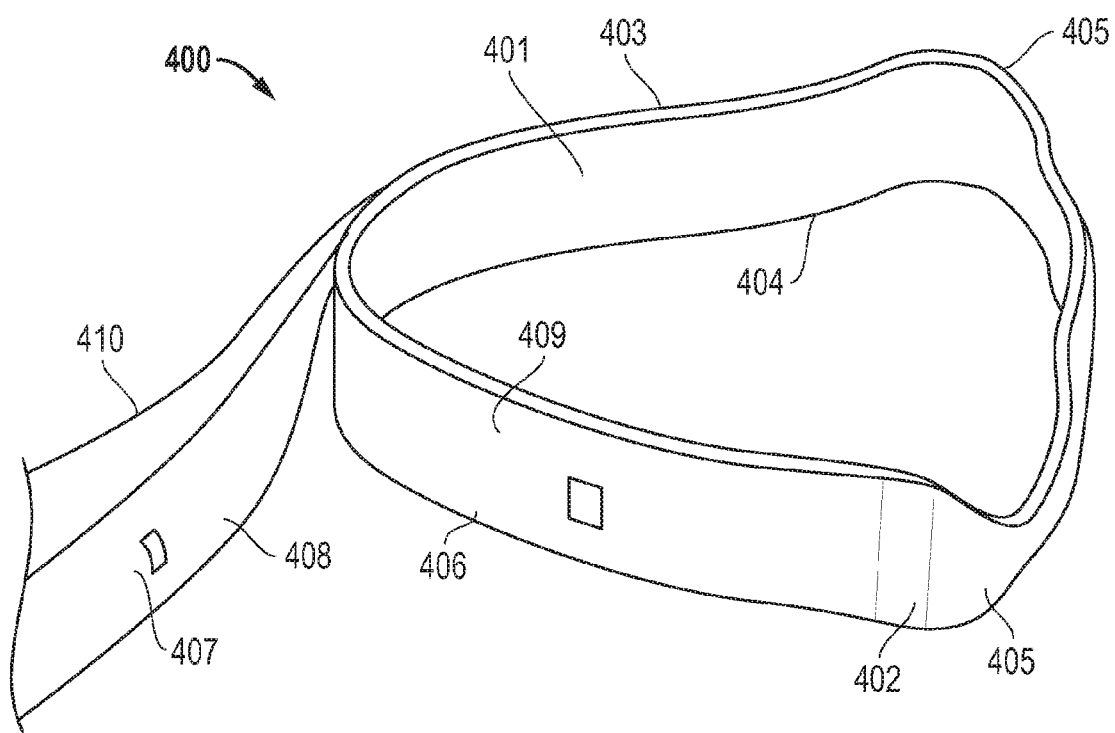
FIG. 4 shows an isometric view of one embodiment of a wristband of the present invention with scalloped portions to relieve stress.

There are a number of overmolding resins disclosed in the prior art. Such resins include thermoplastic polyurethane (TPU), styrene-ethylene/butylene-styrene copolymer (SEBS), copolyesters, copolyamides, thermoplastic rubber (TPR), and thermoplastic vulcanate (TPV). One of the preferred resins has been a modified polypropylene-based resin with the ability to adhere to a polypropylene substrate. The development of new overmold resins has resulted in additional substrate possibilities, including acrylonitrile butadiene styrene (ABS), polycarbonate (PC), and nylon. This broader range of resins offers many opportunities for various design applications while presenting new challenges with respect to adhesion, part design, and tooling. By selecting the proper resins, chip and antenna, it is possible for the chip and antenna to withstand the pressure exerted during molding, In another embodiment of a stretchable wristband, shown in FIG. 4, wristband 400 has an inner surface 401, an outer surface 402, a top edge 403, and a bottom edge 404. The top edge 403 is approximately equidistant from the bottom edge 404 along approximately 75% of the circumference of wristband 400 and then transitions into two separate scalloped portions 405. The portion of the wristband 401 in which top edge 403 is approximately equidistant from bottom edge 404 may have an indentation 406 on the inside 401 or the outside 402 of the band into which an RFID chip 407 and antenna 408 may be positioned. The RFID chip 407 and the antenna 408 may be positioned between a first polymeric film 409 and a second polymeric film 410. The first polymeric film 409 may be sealed to the second polymeric film 410, such as with an adhesive or with heat, so that the RFID chip 407 and the antenna 408 are positioned together and are securely affixed to the wristband 400. In those cases when the antenna 408 is less elastic that wristband 400, the scalloped portions 405 will preferentially stretch to so that the portion of the wristband 300 to which the RFID chip 407 and the antenna 408 are affixed will remain substantially unaffected.

The antenna attached to the RFID chip is a conductive element that permits the chip to exchange data with a reader. Most passive RFID chips make use of a coiled antenna that can create a magnetic field using the energy provided by the reader's carrier signal. An ideal resonant loop antenna is made from a single conductor length, formed into a circle, square, or rectangle. The dynamics of the loop—the currents circulating in the loop and the phases of those currents—are important in establishing the proper interaction with the reader. One must account for the loop's sensitivity, orientation, and radiation patterns to establish working patterns within the allowable ranges.

The antenna designed for each chip is dependent on the form factor of the wristband and the input impedance of the chip. The antenna is an inductive loop or coil which resonates at a frequency based on the following equation:

$$Fr = (2\pi LC)^{-1}$$

Where Fr is the resonant frequency, L is the inductance of the coil and C is the capacitance of the chip plus the parallel capacitance of the coil itself.

The inductance of the coil is determined solely by the antenna's geometric configuration. In general the target frequency for a properly designed chip/antenna couple is 14.5-18 MHz, even though the reader operates at 13.56 MHz. This is due to the proximity to the human body, which tends to detune the antenna. The ISO 14443 system is designed for near proximity reading, and the maximum read range for a tag is approximately 4 cm.

Suitable antennas for the application require a resistance in the range of 2-3 ohms for optimum performance. Given the geometric constraints of placement of the antenna within a wristband, a metallic antenna is preferred. Antenna fabrication technologies currently known in the art include:

(a) Wirewound: the antenna is formed of fine copper wire using a specialized tool, the antenna conformation is maintained by embedding the wire in the plastic body of the tag. This is the dominant technology for plastic card antenna (b) Etched foil: antenna is etched out of a metallic film deposited on a film (PET) substrate. This technology using copper or aluminum film is widely used for labels and tags (c) Printed conductive ink: a silver filled ink is printed on a film substrate in the format desired for the antenna. This technique is usually not suitable for high frequency antennas Whichever technique is used to fabricate the antenna, it is desirable to fix the antenna geometry as much as possible to maintain optimal performance. If the antenna is to be wrapped around a fixed radius (as in a wristband) acceptable antenna performance can be maintained as long as the ratio of the major axis of the antenna to radius of curvature is greater than pi (3.14). In one embodiment, this gives a major axis for the antenna of approx. 4.5 inches (11.43 cm).

Calculations based on an antenna sized for a band using one finite element method simulation package show that an antenna can be designed for the foot print constraint of 1 cm×11.43 cm. The calculation results are given in the table below for the chips at the ends of the capacitance spectrum.

| Chip | Coil length (cm) | Coil Width (cm) | Number of Coil Turns | Line width/ space (in) foil antenna | Resonant Freq. (MHz) |
| --- | --- | --- | --- | --- | --- |
| ST 19WRO2 | 11.43 | 0.7 | 3 | 0.005/0.010 | 15.3 |
| Inside MP4003 | 11.43 | 0.7 | 4 | 0.005/0.010 | 18.1 |

Figure 5A:
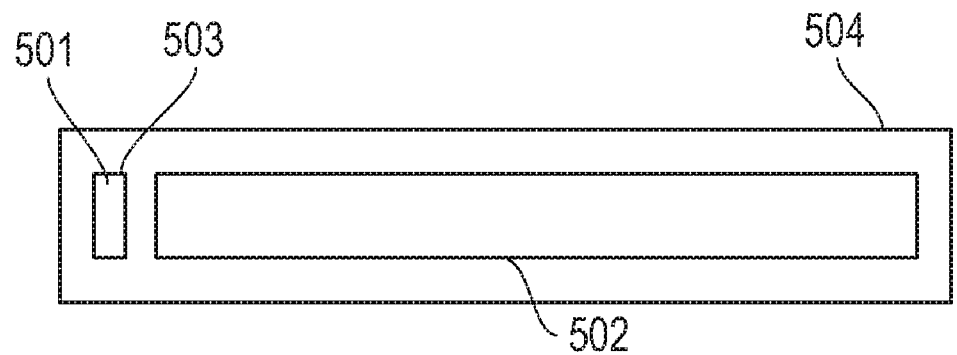
FIG. 5A shows a single pole configuration of an antenna and an RFID chip.
Figure 5B:
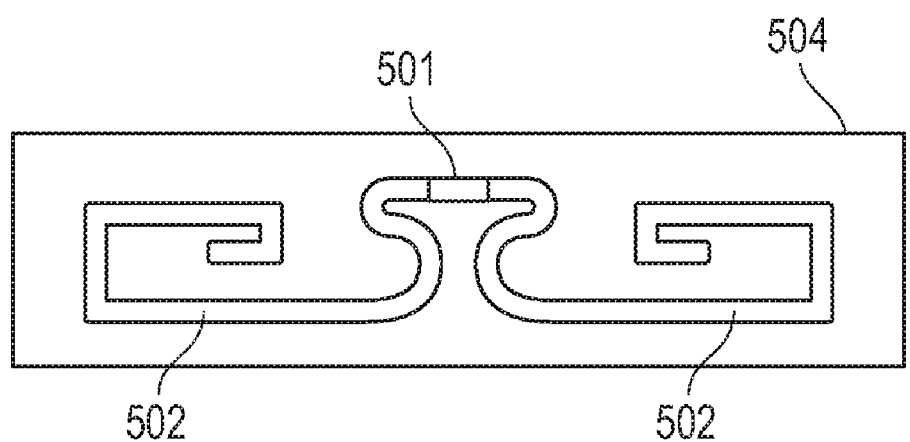
FIG. 5B shows a di-pole configuration of an antenna and an RFID chip.

A single pole antenna configuration can be seen in FIG. 5A, wherein the microchip 501 is attached to the antenna 502 at connection point 503 and is packaged on a plastic substrate 504. In another embodiment, a di-pole configuration, as shown in FIG. 5B, may be used. The antenna may be made of any material known in the art, such as copper, aluminum, conductive inks, conductive polymers and the like.

Figure 6A:
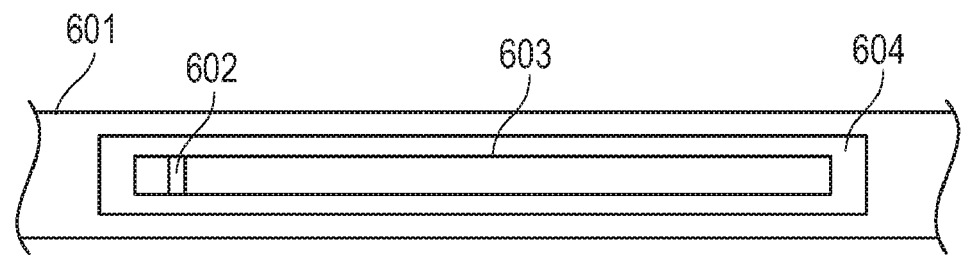
FIG. 6A shows a top view of one embodiment of a wristband of the present invention in which a chip and an antenna are affixed to a polymeric membrane.
Figure 6B:
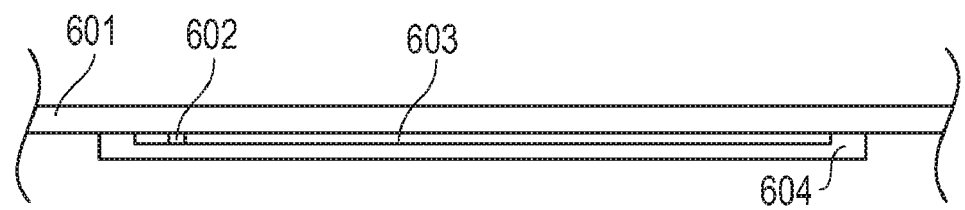
FIG. 6B shows a side view of one embodiment of the present invention in which a chip and an antenna are affixed to a polymeric membrane.
Figure 6C:
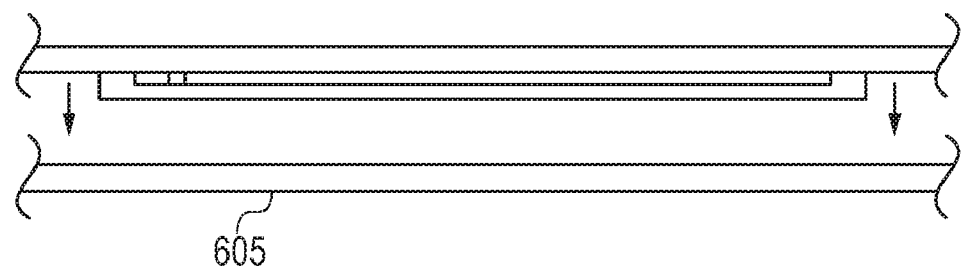
FIG. 6C shows a side view of one embodiment of the present invention in which a chip and an antenna are affixed to a polymeric membrane and a preform and the preform is overmolded to a wristband blank.

In one embodiment, a wristband is injection molded and subsequently configured with the microchip and antenna as shown in FIGS. 6A, 6B and 6C. A microchip 602 and antenna 603 are adhered to an overlay material 604, such as polyester or polypropylene, and the overlay material 604 is affixed to a preform 601. The chip 602 and antenna 603 are positioned on the overlay material 604 in such a manner that the chip 602 and the antenna 603 are on the opposite side of the overlay material from the preform 601. The preform is then applied, either mechanically or by overmolding, to wristband blank 605 to create a finished wristband. Through this process, the chip 602 and the antenna 603 will be positioned between the preform 601 and the wristband blank 605 to create a finished product.

Injection molding, in which a mold is injected with the wristband material and, once the material has cooled, the wristband is extracted from the mold, is one of the most common and cost effective methods of producing stretchable wristbands. In many cases, it is desirable to use more than one material in the wristbands, in which case a multimaterial molding process can be used. In general, multimaterial molding takes advantage of two or more materials with uniquely different properties by incorporating them into a single molded component. Multimaterial molding processes include overmolding, coinjection, two-shot, and sandwich molding.

In one embodiment of the present invention, a wristband is made in two parts using an overmolding process. In overmolding applications, an overmold is injection molded around, over, under, or through a substrate material to complete the desired part. This injection molding can be done with a multishot process or by insert molding. Usually, the overmolded material is an elastomeric resin.

In a multishot process, two or more barrels are configured so that different resins can be shot into the same injection molding tool. The barrels, arranged parallel to each other or in an "L" configuration, feed resin through common or separate injection points into the tool. When one common injection point is used, the process is called coinjection, and the result is a composite part in which a skin encapsulates a core resin. Separate injection points result in an overmolded part, which is produced by molding one component on top of the other, creating a layered structure.

In the insert molding process, a substrate must be taken out of the tool and placed into a different core and cavity to create the volume for the overmold material. During this process, a separate tool runs in the same or a different-size press (depending on shot size). Usually, the overmold portion of a part is significantly smaller than the substrate. Preheating the substrate may be necessary to bring its surface temperature closer to the melt temperature of the overmold, so as to reach optimum bond strength.

Figure 7:
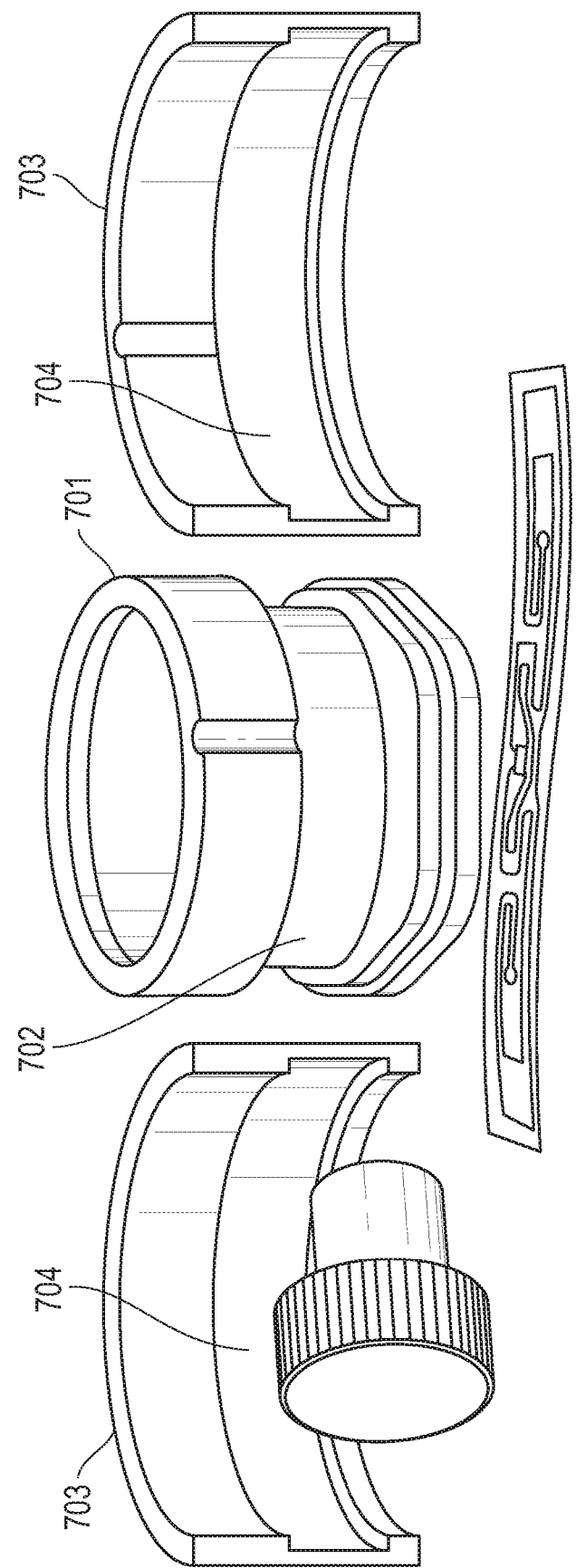
FIG. 7 shows a perspective view of a mold used to affix a chip and an antenna to a stretchable wristband.
Figure 8:
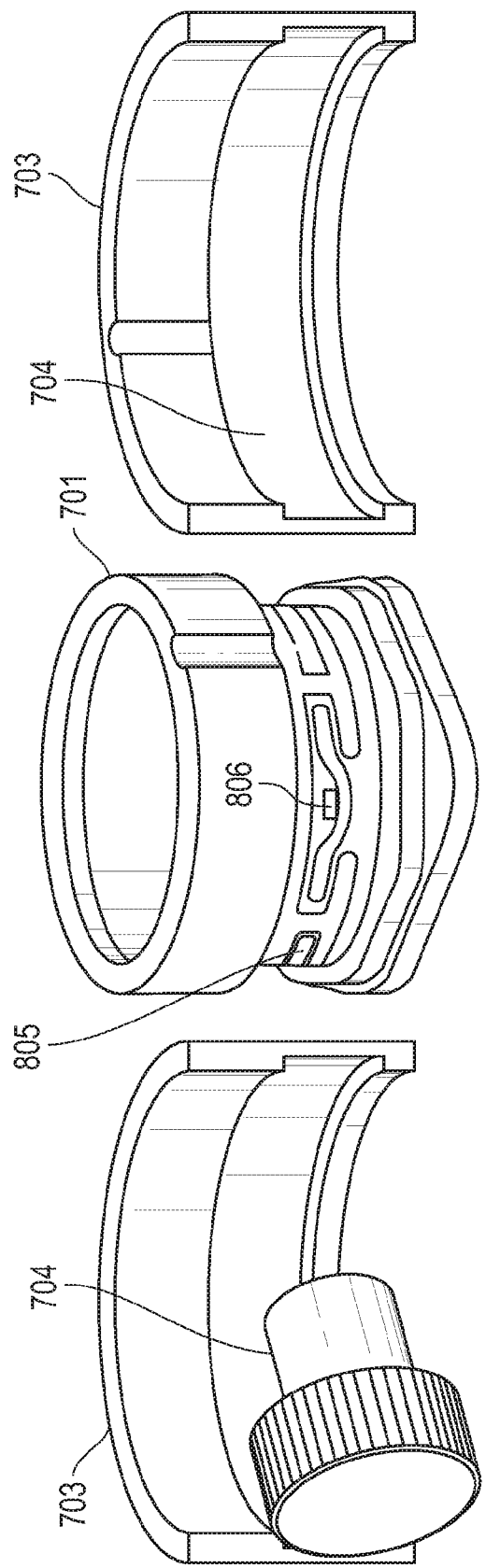
FIG. 8 shows a perspective view of a mold with a chip and an antenna positioned for molding a stretchable wristband.

Referring now to FIG. 7, wherein a mold for forming a stretchable wristband is shown. The mold may be made of any material known in the art. In this embodiment, the mold is configured with an internal core 701 which includes a groove 702 used to form the inner half of the stretchable wristband and two outer portions 703 each of which includes a groove 704 used to form the outer half of the stretchable wristband. FIG. 8 shows the microchip 806 and antenna 805 removably affixed to the grove 702 in the internal core 701 in such a manner that, when the outer portions 703 of the mold are secured to the internal core 701 and the desired material is injected into the mold, the microchip 806 and antenna 805 will be affixed to the inside of the stretchable wristband.

More than the other multimaterial molding processes, the overmolding process has improved the aesthetics, design, and functionality of many consumer products, including wristbands, over the last decade. The overmolding process was originally used to create texture, commonly called soft touch, but it is now appreciated that the process offers may other benefits, including ergonomics, two-color aesthetics, brand identification, and property modification. The overmolding process can also add new functionality to a product, such as noise and vibration dampening, waterproofing, and shock absorption.

Encapsulation of an RFID inlay in a circular mold is a significant technical challenge. For example, the integration of a contactless payment chip into the wristband is constrained by the physical size of the chip module. In general, the chip module would be affixed within a package and the wristband would be approximately two times as wide as the package and two times as thick, this requires a band with a profile of at least approximately 10 mm wide and 1.5 mm thick. In addition, if the antenna is inelastic, the portion of the wristband in which the antenna is located will be semi-rigid since the underlying antenna material (e.g. copper, aluminum foil or wire) will not stretch to the extent that a polyurethane or silicone rubber of the non-RFID band does. The antenna may be constructed as a standard inlay on polyethylene or vinyl film and overmolded, this would allow the inlay to be flexible around the wrist; however there will be a significant strain variation in the region at the edge of the inlay. This may lead to durability issues with the band. In addition a more elastic rubber than is presently used may be required.

As can be appreciated by one skilled in the art, references to an RFID chip include multiple chips or circuitry capable of performing the functions described herein. While it may be desirable in some instances to use a single chip to, for example, store and send information, there may be other instances where it is more desirable or cost effective to use a plurality of chips to provide the required functionality.

Figure 9A:
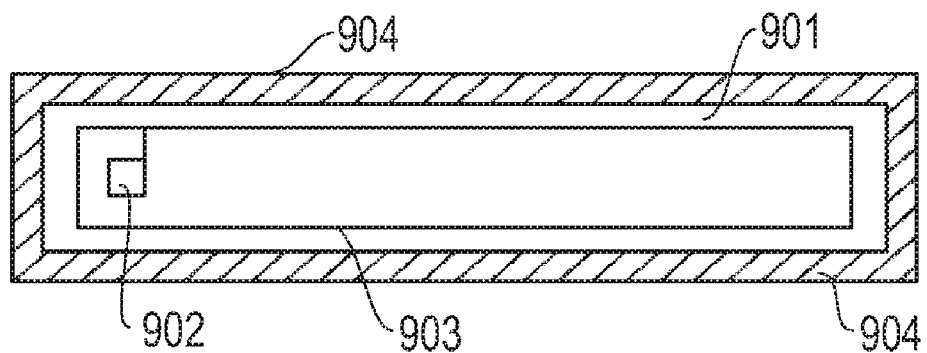
FIG. 9A shows a top view of a chip and antenna assembly heatsealed between two polymeric materials.
Figure 9B:
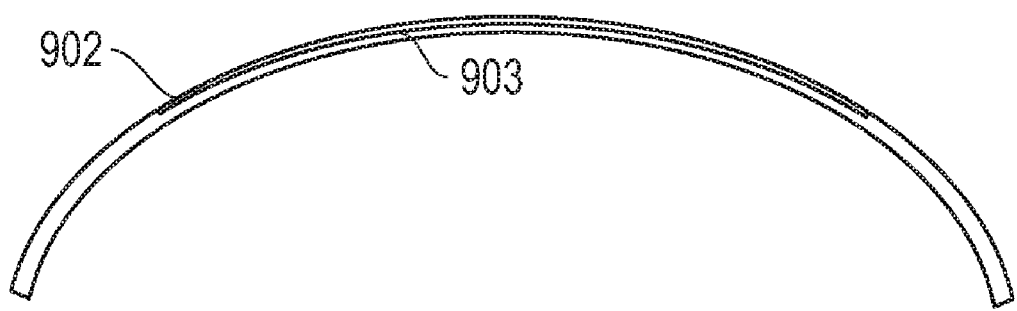
FIG. 9B shows a side view of a chip and antenna assembly heatsealed between two polymeric materials.

Another alternative for forming the microchip and antenna into the stretchable wristband is shown in FIG. 9. A microchip 902 affixed to an antenna 903 is placed on top of a heat-sealable polymeric material 901, such as polypropylene. Another sheet of heat-sealable polymeric material 901 is then placed on top of the microchip 902 and antenna 903. The chip/antenna package is formed into an arc, shown in FIG. 9B, with a radius approximating the radius of the mold into which the package will be placed. The outer edges 904 of the heat-sealable polymeric material 901 are then sealed together. The curved chip/antenna package can then be inserted into a mold and removably affixed in place during injection molding. Alternatively, the curved chip/antenna package can be inserted into a preform, such as that shown in FIG. 3 and described above, prior to overmolding.

In some embodiments it may be desirable to have the heat-sealable polymeric material completely cover the microchip and antenna so that the chip and antenna are completely encapsulated between the two layers of material. In other cases, it may be desirable to create openings in the two sheets of polymeric material so that, for example, when a preform is overmolded, the material used in overmolding comes into direct contact with the preform through the openings. In still other cases, it may be desirable to simply coat the antenna with the polymeric materials so that, for example, the polymeric material can be used to temporarily keep the chip and antenna in place during injection molding. It is important to use a material that provides adequate adhesion to the wristband material and that is durable enough to withstand the rigors of use. Laminated polyurethane materials that crosslink at temperatures of approximately 270 degrees Fahrenheit are one example of suitable materials.

Figure 10:
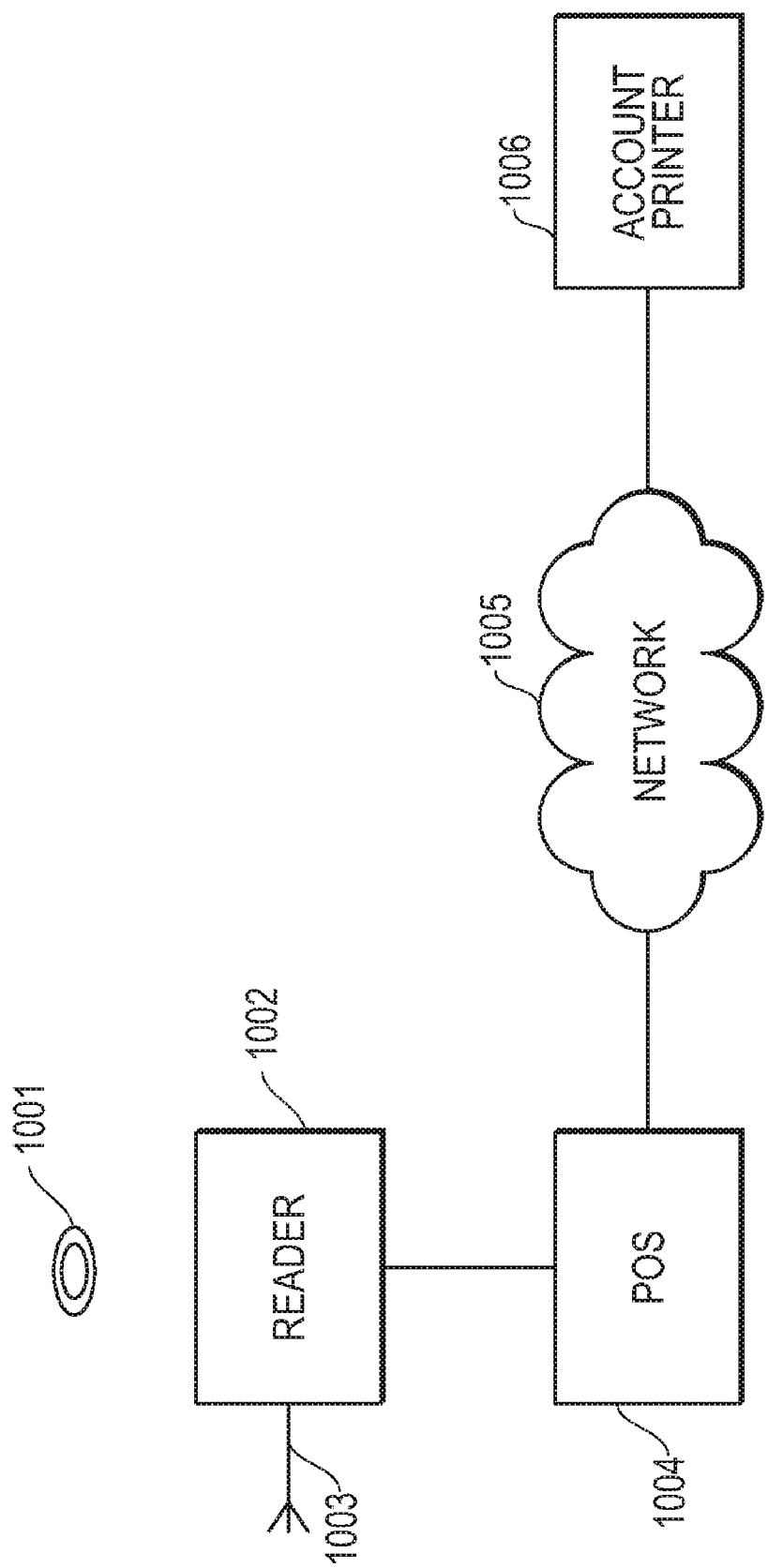
FIG. 10 illustrates an exemplary RFID transaction in accordance with one embodiment of the present invention.

An exemplary contactless payment system is illustrated in FIG. 10. A wristband with an integral RFID module 1001 is presented for a transaction when it is placed in radio frequency communication with an RFID reader 1002 through an antenna 1003. The transaction proceeds when RFID reader 1002 provides an interrogation signal for powering RFID module 1001, thereby providing the necessary power for activating the RFID components within the wristband. Once RFID module 1001 is activated, it provides a transponder identifier and/or account identifier to RFID reader 1002. RFID reader 1002 then provides the identifier to point of sale device 1004, which provides the identifier to account provider 1006 through network 1005 for transaction processing.

RFID reader 1002 includes any conventional RFID reader configured to provide an interrogation signal and receive a transaction account identifier from an RFID module. RFID reader 1002 communicates with RFID module 1001 through an antenna 1003, which may be configured as either internally or externally. Additionally, RFID reader 1002 communicates with the point-of-sale system 1004 via a suitable data link. Point-of-sale device 1004 is any device capable of receiving transaction account information from RFID reader 1002 and forwarding the information to an account provider 1006 for transaction completion.

Account provider 1006 may be any entity facilitating completion of a point-of-sale transaction, including systems permitting the use of either preloaded and non-preloaded accounts. Typical account providers may be, for example, American Express, MasterCard, Visa, Discover, and others. The account identifier may be any identifier for an account (e.g., credit, charge, debit, checking, savings, reward, loyalty, or the like) which is maintained by an account provider 1006 and which is used to complete a financial transaction. A typical account identifier is correlated to a credit or debit account, loyalty account, or rewards account maintained and serviced by the account provider 1006. A account identifier includes, for example, a sixteen-digit credit card number.

The stretchable wristband of the present invention may be issued by an account provided in much the same way that account providers currently issue credit cards. The wristband could be configured with the account provider's colors, logo, slogan or trademark. When worn by the user, the account identifier remains secure unless the wristband passes with about 2 to 4 cm of an RFID reader.

Although the stretchable wristband with an integral RFID chip is described for use in a contactless payment system, there are a numerous other uses. For example, rather than carrying account information on the RFID module, the module could be contain information regarding the wearer's health, such as drug allergies, known medical conditions, current medications, etc. In instances where the wearer was unable to communicate with medical personal, the wristband could be scanned by placing it in proximity of an RFID reader whereupon the medical personnel would have access to relevant information. Because of the highly sensitive nature of personal medical information, the RFID module could include a security feature wherein, prior to scanning the RFID module with an RFID reader, the wearer must provide a biometric key, such as a fingerprint. When, in this example, the fingerprint is scanned and accepted by the RFID module, the wearer's personal health information is released to the RFID reader. Biometric identifiers that could be used as a key to the health information include the wearer's fingerprint, facial features, hand geometry, voice, iris, retina, vein patterns, palm print, DNA, ear shape, odor and others. This biometric key could similarly be used with contactless payment systems and other RFID applications.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible wristbands, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A wristband comprising:
an inner surface, an outer surface, a top edge and a bottom edge, wherein said bottom edge and said top edge are approximately equidistant from one another along the circumference of said wristband;
a groove positioned in said inner surface;
an RFID chip and antenna positioned in said groove; and
an overmold portion molded into said groove and over said RFID chip and antenna such that said inner surface and said outer surface are approximately equidistant from one another along said circumference of said wristband.

2. The wristband of claim 1, wherein said wristband is made of one or more of thermoplastic polyurethane, styrene-ethylene/butylene-styrene copolymer, copolyester, copolyamide, thermoplastic rubber, thermoplastic vulcanite, acrylonitrile butadiene styrene, polycarbonate, and nylon.

3. The wristband of claim 1 wherein the depth of said groove is approximately one-half of the distance between said inner surface and said outer surface.

4. The wristband of claim 1 wherein the circumference of said wristband is between about 18 cm and 22 cm.

5. The wristband of claim 1 wherein said wristband is not made of silicone.

6. The wristband of claim 1 wherein said overmold portion is made of polypropylene.

7. The wristband of claim 1 wherein the RFID chip is ISO/IEC 14443 compliant.

8. The wristband of claim 1 wherein said wristband is circular and does not require snaps, hooks, velcro, or other fasteners to be worn on the wrist.

9. A wristband comprising:
an inner surface, an outer surface, a top edge and a bottom edge, wherein said bottom edge and said top edge are approximately equidistant from one another along approximately 75% of the circumference of said wristband, and wherein one or more scallops are located adjacent to said the end of said approximately 75% of the circumference of said wristband;
an RFID chip and antenna affixed to the outer or inner surface of said wristband;
an overlay material affixed over said RFID chip and said antenna such that said RFID chip and said antenna are secured to said wristband.

10. The wristband of claim 9, wherein said wristband is made of one or more of thermoplastic polyurethane, styrene-ethylene/butylene-styrene copolymer, copolyester, copolyamide, thermoplastic rubber, thermoplastic vulcanite, acrylonitrile butadiene styrene, polycarbonate, and nylon.

11. The wristband of claim 9 wherein the circumference of said wristband is between about 18 cm and 22 cm.

12. The wristband of claim 9 wherein said wristband is not made of silicone.

13. The wristband of claim 9 wherein said overlay material is made of polypropylene.

14. The wristband of claim 9 wherein the RFID chip is ISO/IEC 14443 compliant.

15. A wristband comprising:
an inner surface, an outer surface, a top edge and a bottom edge, wherein said bottom edge and said top edge are approximately equidistant from one another along approximately 75% of the circumference of said wristband, and wherein said wristband is circular and does not require snaps, hooks, velcro, or other fasteners to be worn on the wrist;
an RFID chip and antenna affixed to the outer or inner surface of said wristband;
an overlay material affixed over said RFID chip and said antenna such that said RFID chip and said antenna are secured to said wristband.

16. The wristband of claim 15, wherein said wristband is made of one or more of thermoplastic polyurethane, styrene-ethylene/butylenes-styrene copolymer, copolyester, copolyamide, thermoplastic rubber, thermoplastic vulcanite, acrylonitrile butadiene styrene, polycarbonate, and nylon.

17. The wristband of claim 15 wherein the circumference of said wristband is between about 18 cm and 22 cm.

18. The wristband of claim 15 wherein said wristband is not made of silicone.

19. The wristband of claim 15 wherein said overlay material is made of polypropylene.

20. The wristband of claim 15 wherein the RFID chip is ISO/IEC 14443 compliant.

21. A contactless payment system comprising:
a wristband having an inner surface, an outer surface, a top edge and a bottom edge, wherein said bottom edge and said top edge are approximately equidistant from one another along the circumference of said wristband;
a groove positioned in said inner surface;
an RFID chip and antenna positioned in said groove; and
an overmold portion molded into said groove and over said RFID chip and antenna such that said inner surface and said out surface are approximately equidistant from one another along said circumference of said wristband;
an RFID reader capable of reading information from said RFID chip,
a point-of-sale system in communication with said RFID reader, and
an account provider, wherein said account provider is in communication with said point-of sale-system and approves or authorizes transactions initiated by said wristband coming in proximity to said RFID reader.

22. The contactless payment system of claim 21, wherein said wristband is made of one or more of thermoplastic polyurethane, styrene-ethylene/butylene-styrene copolymer, copolyester, copolyamide, thermoplastic rubber, thermoplastic vulcanite, acrylonitrile butadiene styrene, polycarbonate, and nylon.

23. The contactless payment system of claim 21, wherein said wristband is not made of silicone.

24. The contactless payment system of claim 21, wherein said antenna is a bipole antenna.

25. The contactless payment system of claim 21, wherein the RFID chip is ISO/IEC 14443 compliant.

26. A contactless payment system comprising:
   a wristband having an inner surface, an outer surface, a top edge and a bottom edge, wherein said bottom edge and said top edge are approximately equidistant from one another along approximately 75% of the circumference of said wristband, and wherein one or more scallops are located adjacent to said the end of said approximately 75% of the circumference of said wristband;
   an RFID chip and antenna affixed to the outer or inner surface of said wristband;
   an overlay material affixed over said RFID chip and said antenna such that said RFID chip and said antenna are secured to said wristband;
   an RFID reader capable of reading information from said RFID chip,
   a point-of-sale system in communication with the said RFID reader, and
   an account provider, wherein said account provider is in communication with said point-of-sale-system and approves or authorizes transactions initiated by said wristband coming in proximity to said RFID reader.

27. The contactless payment system of claim 26, wherein said wristband is made of one or more of thermoplastic polyurethane, styrene-ethylene/butylene-styrene copolymer, copolyester, copolyamide, thermoplastic rubber, thermoplastic vulcanite, acrylonitrile butadiene styrene, polycarbonate, and nylon.

28. The contactless payment system of claim 26, wherein said wristband is not made of silicone.

29. The contactless payment system of claim 26, wherein said antenna is a bipole antenna.

30. The contactless system of claim 26, wherein the RFID chip is ISO/IEC 14443 compliant.

* * * * *